(12) United States Patent
Agnihotri et al.

(10) Patent No.: US 6,260,676 B1
(45) Date of Patent: Jul. 17, 2001

(54) MAGNETIC PARTICLE DAMPER APPARATUS

(75) Inventors: Ashok K. Agnihotri, Southlake; Stanley G. Sadler, Arlington, both of TX (US)

(73) Assignee: Bell Helicopter TEXTRON Inc., Fort Worth, TX (US)

( * ) Notice: Subject to any disclaimer, the term of this patent is extended or adjusted under 35 U.S.C. 154(b) by 0 days.

(21) Appl. No.: 09/442,998

(22) Filed: Nov. 18, 1999

Related U.S. Application Data

(60) Continuation of application No. 09/233,751, filed on Jan. 20, 1999, now Pat. No. 6,009,982, which is a division of application No. 08/842,340, filed on Apr. 24, 1997, now Pat. No. 5,984,056.

(51) Int. Cl.$^7$ ...................................................... B64L 27/38
(52) U.S. Cl. ....................... 188/267.2; 188/378; 267/136; 416/107; 416/134 A; 416/141
(58) Field of Search ................................ 188/267, 267.2, 188/378, 379, 380; 267/136, 140.14, 140.15; 416/107, 134 A, 134 R, 140, 141

(56) References Cited

U.S. PATENT DOCUMENTS

| 4,200,003 | 4/1980 | Miller ...................................... 74/574 |
| 4,249,862 | * 2/1981 | Waddington et al. ............ 416/134 A |

(List continued on next page.)

OTHER PUBLICATIONS

"The Calculation of the Force and the Couple of Magnetic Disc Brakes, Clutches, and Induction Motors Which have Smooth and Solid Rotors," Remus Radulet et al., 1962, pp. 1–7. (Translation for U.S. Army Engineer Research and Development Laboratories—Best available copy).

"Electromagnetic Clutches and Couplings," T.M. Vorob'yeva, 1965, pp. 85–107 (Translation from the Russian by O.M. Blunn).

"The Magnetic Particle Coupling," J. Evans, *Power Drives*, Aug. 1973, pp. 130–134.

"Theory and Performance of the Disc–Type Electromagnetic Particle Clutch under Continuous Slip Service," S. Ramakrishnan et al., IEEE Proc., vol. 127, No. 2, Narcg 1980, pp. 81–88.

(List continued on next page.)

*Primary Examiner*—Matthew C. Graham
(74) *Attorney, Agent, or Firm*—Gardere Wynne Sewell LLP; Sanford E. Warren, Jr.; Theodore F. Shiells

(57) ABSTRACT

A magnetic particle damper apparatus is provided for damping motion between two relatively movable members. The damper apparatus comprises first and second conductor members each attachable to one of the relatively movable members. The conductor members are disposed with confronting surfaces having a gap therebetween filled with a quantity of magnetic particles. A magnetic element is attached to one of the conductor members, producing magnetic flux which is substantially confined to a magnetic flux path defined by relatively magnetically permeable regions and relatively magnetically non-permeable regions of the conductor members to flow across the gap and through the magnetic particles. The magnetic field causes the magnetic particles along the flux path to adhere to one another and to the confronting surfaces of the conductor members producing a force opposing relative motion between said movable members and dissipating energy when the conductor members move relative to one another.

19 Claims, 8 Drawing Sheets

U.S. PATENT DOCUMENTS

| | | | |
|---|---|---|---|
| 4,297,078 | * 10/1981 | Marti | 416/134 A |
| 4,679,775 | 7/1987 | Funaki et al. | 267/64.27 |
| 4,724,923 | 2/1988 | Waterman | 181/208 |
| 4,796,911 | 1/1989 | Kuroki et al. | 20/689 |
| 4,893,699 | 1/1990 | Engelsdorf et al. | 188/299 |
| 5,277,281 | 1/1994 | Carlson et al. | 188/267 |
| 5,284,330 | 2/1994 | Carlson et al. | 267/140.14 |
| 5,382,373 | 1/1995 | Carlson et al. | 252/62.55 |
| 5,398,917 | 3/1995 | Carlson et al. | 267/140.14 |
| 5,492,312 | 2/1996 | Carlson | 267/140.14 |
| 5,573,088 | 11/1996 | Daniels | 188/267 |

OTHER PUBLICATIONS

"Design Analysis of Electromagnetic Particle Clutch," N. Mikhaeil–Boules, IEEE Paper 0–7803–1993, 1994, pp. 357–360.

"Permanent Magnet Materials and Their Application," P. Campbell, 1994, pp. 72–75, 84–91.

Rheonetic Magnetic Fluid Systems (Brochure), Lord Mechanical Products, Mar. 1996, pp. 1–12.

Computer Patent Search Listing, Feb. 10, 1995, pp. 1–41.

* cited by examiner

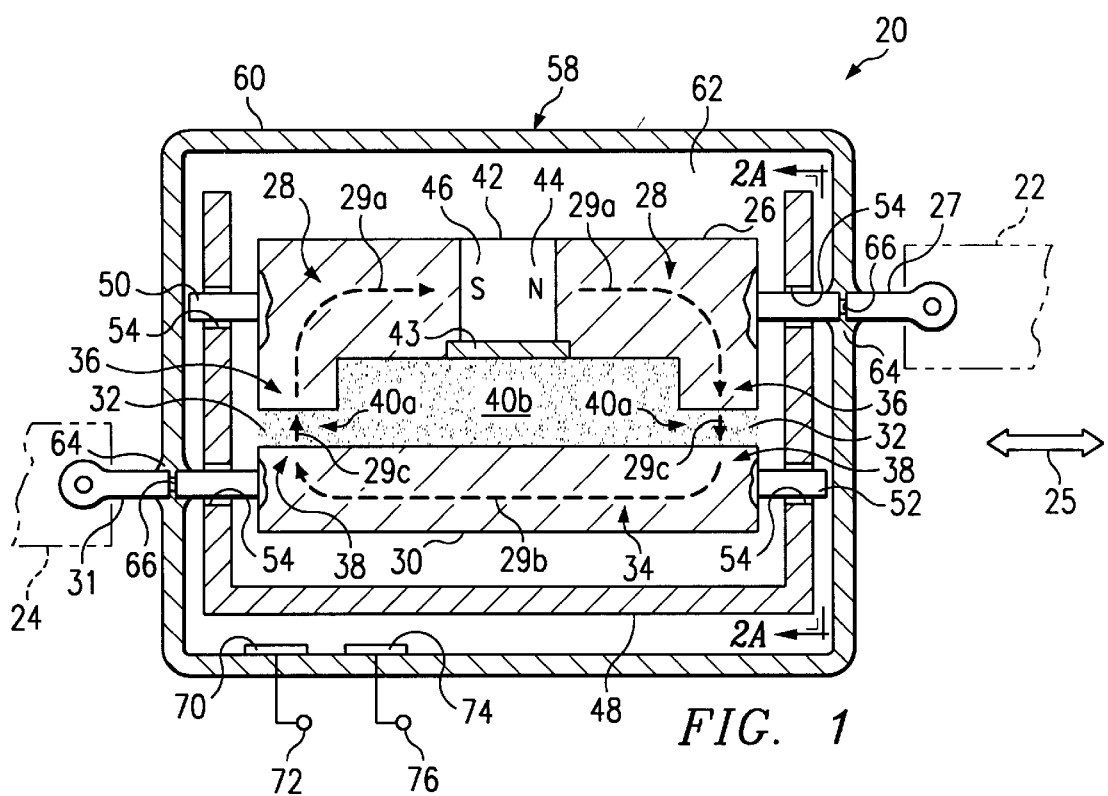
FIG. 1
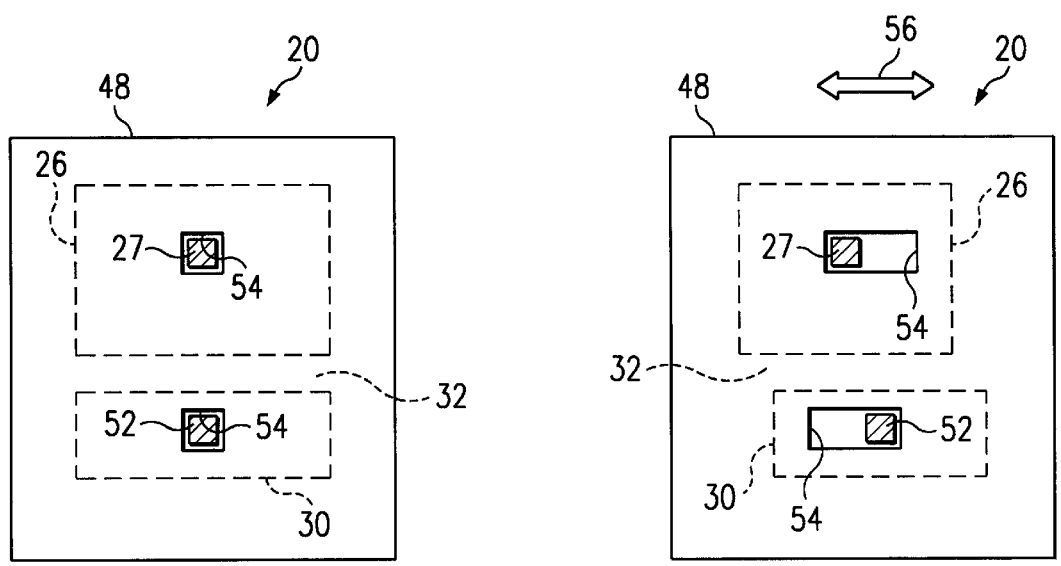
FIG. 2A
FIG. 2B

MAGNETIC PARTICLE DAMPER APPARATUS

This application is a con't of Ser. No. 09/233751 filed Jan. 20, 1999, U.S. Pat. No. 6009,982 which is a Div. of Ser. No. 08/842,340 filed Apr. 24, 1997, U.S. Pat. No. 5,984,056.

BACKGROUND OF THE INVENTION

A damper is a hardware device for dissipating energy in a mechanical system having relatively movable parts. A damper provides forces opposing relative motion of the movable parts. Commonly encountered examples of damping apparatus include the shock absorbers in a car and the lead-lag damper in the rotor system of a helicopter.

A variety of damping apparatus are known in the art, including friction dampers and elastomeric dampers, which dissipate energy through the rubbing or deformation of solid materials, and pneumatic and hydraulic dampers, which dissipate energy by pumping fluids through an orifice. A recent variation to the hydraulic-type damper utilizes magnetorheological (MR) fluids comprising magnetic particles suspending in a carrier fluid such as an oil or gel. These MR fluids undergo a change in apparent viscosity in the presence of a magnetic field. Examples of MR fluid dampers are disclosed in the following U.S. Pat. Nos.: 5,277,281; 5,284,330; 5,382,373; 5,398,917; and 5,492,312. MR fluid dampers have the ability to change the apparent viscosity of the working fluid, and thus the damping. characteristics of the device, by changing the strength of the magnetic field, for example, by changing the current flow through the coils of an electromagnet.

While MR fluid dampers allow the electrical adjustment of damping characteristics, they also have the following disadvantages: first, the fluid component of an MR damper can leak out of the device if the integrity of the sealed cavity is not maintained, degrading the performance of the damper and possibly contaminating other system components with the abrasive fluid. Second, the magnetic particle component of an MR fluid will "settle out" of the fluid component over time or when exposed to high G-forces, i.e., those over approximately 10 G's. Third, the fluid component of MR fluid will generally change viscosity as a function of temperature, and may even freeze or vaporize at temperature extremes such as those that may be encountered in aircraft applications where components may be exposed to temperatures ranging from 55° C. during high temperature operation down to −45° C. when stored under arctic conditions. Fourth, MR fluids are highly abrasive due to the small particles contained in the carrier fluid. This abrasive quality will tend to erode orifices through which MR fluids are pumped during the damper operation, and will also erode dynamic seals or other sliding surfaces.

Devices are also known which utilize the adhesion of dry magnetic particles to transmit forces between rotating members. For the purposes of this application, particles are considered "dry" when they are not suspended or immersed in a liquid or gel medium. Examples of such devices are the well known magnetic particle clutch and the magnetic particle brake. A magnetic particle clutch typically consists of a first rotating (input) shaft connected to a magnetic disk and a second rotating (output) shaft connected to another magnetic disk. These disks have a small gap between them and the gap is filled with a finely divided magnetic powder. Both disks and the gap are contained within a magnetic housing which also contains an electromagnetic coil. When electric current passes through the coil, it establishes a magnetic field in the gap and the two magnetic disks. This magnetic field causes the magnetic particles to adhere to one another and the adjoining disks and form chains bridging the gap between the two disks such that torque is transmitted between the two rotating shafts. Magnetic particle brakes are similar except that the output shaft is attached to a non-rotating "ground," or is replaced by part of the housing, which is "attached to ground." Magnetic particle clutches and brakes are known in which the magnetic field is produced by either a permanent magnet or an electromagnet. Where a permanent magnet is used the clutch will transmit torque between the rotating input and output shafts until a maximum "slip" torque is achieved, at which time the input shaft will begin to slip with respect to the output shaft, however, the clutch will continue to transmit torque between the shafts at the slip torque value. When the magnetic field of a magnetic particle clutch is provided by an electromagnet, it is possible to have an intermittent-acting clutch by turning the electric current through the coils of the electromagnet on or off, or alternatively, it is possible to have a magnetic clutch in which the slip value of torque transmission may be varied by varying the electric current passing through the coils. Whether using permanent magnets, electromagnets, or a combination of both, however, magnetic particle clutches have always been used to transmit torques between rotating shafts or to limit the maximum torque transmitted through a system by allowing rotation between shafts.

SUMMARY OF THE INVENTION

In one aspect of the current invention a magnetic particle damper apparatus is provided for damping motion between two relatively movable members. The damper apparatus comprises first and second conductor members each attachable to one of the relatively movable members. The conductor members are disposed with confronting surfaces having a gap therebetween filled with a quantity of dry magnetic particles. For the purposes of this application, the term magnetic particle refers to dry magnetic particles unless otherwise indicated. A magnetic element is attached to one of the conductor members, producing magnetic flux which is substantially confined to a magnetic flux path defined by relatively magnetically permeable regions and relatively magnetically non-permeable regions of the conductor members to flow across the gap and through the magnetic particles. The magnetic field causes the magnetic particles along the flux path to adhere to one another and to the confronting surfaces of the conductor members producing a force opposing relative motion between the conductor members and thereby dissipating energy when the conductor members move relative to one another. Multiple embodiments of such magnetic particle dampers are described, including those having circular and toroidal flux paths and those having multiple gaps. Additional embodiments for damping apparatus having spring elements connected in series, parallel, and series-parallel with the damping members are provided.

In another aspect of the current invention, a helicopter rotor assembly is provided. The rotor assembly comprises a rotating yoke member, a blade member, and a magnetic particle damper. The blade member is connected to the yoke member and each member has a damper attachment portion, the two damper attachment portions being spaced-apart from one another. The blade member is movable with respect to the yoke member to define a range of distances between the damper attachment portions. The magnetic particle damper, which is as previously described, has a first conductor member attached to the damper attachment portion of the yoke member and a second conductor member attached to the damper attachment portion of the blade member. Oscillations in the lead-lag direction between the yoke member and blade member of the rotor assembly are thereby damped by the magnetic particle damper.

In another aspect of the current invention, an automotive suspension system is provided. The suspension system comprises a magnetic particle damper connected between an automobile chassis and a wheel hub which translates with respect to the chassis. The relative motion between the automobile chassis and the wheel hub is thereby damped by the magnetic particle damper. The magnetic particle damper of this embodiment can include permanent magnets, electromagnets, or a combination of both. The suspension system can also include a spring and a conventional fluid orifice type shock absorber.

Other features, advantages, and characteristics of the present invention will become apparent upon consideration of the following drawings and detailed description.

BRIEF DESCRIPTION OF THE DRAWINGS

FIG. 1 is a side view in partial section of a first embodiment of a magnetic particle damping apparatus according to the current invention;

FIG. 2A is a partial end view of the damping apparatus of FIG. 1 taken along lines 2A—2A of FIG. 1;

FIG. 2B is a partial end view, similar to FIG. 2A, of an alternative embodiment of a magnetic particle damping apparatus;

DETAILED DESCRIPTION

Figure 3A:
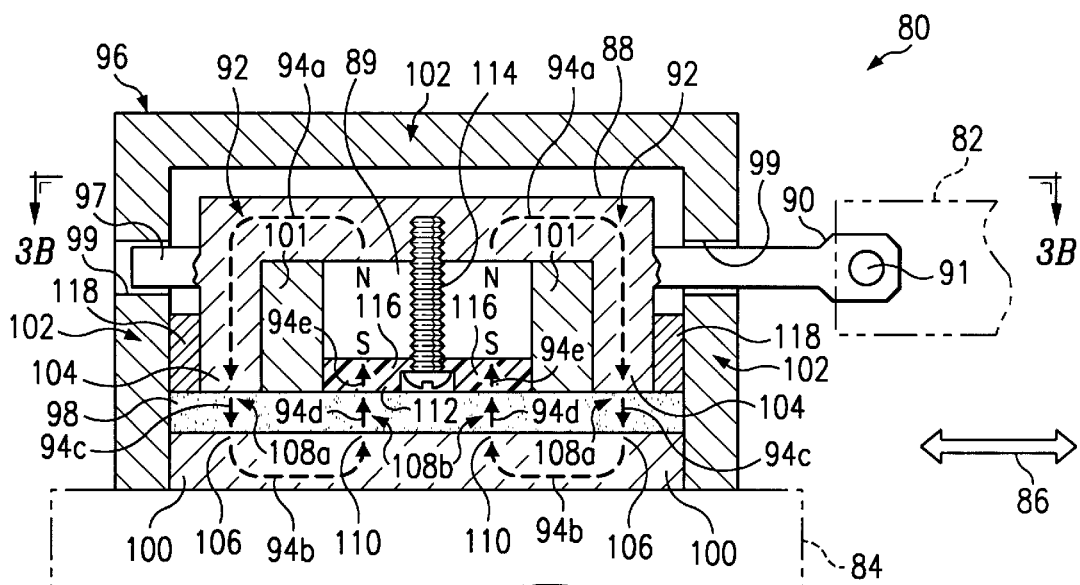
FIG. 3A is a side view in partial section of another embodiment of a magnetic particle damping apparatus according to the current invention.

Referring now generally to FIGS. 1, 2A and 2B, and in particular to FIG. 1, a magnetic particle damper apparatus 20 is provided for damping motion between first and second relatively movable members, 22 and 24, respectively (shown in phantom) which move in the direction indicated generally by arrow 25. Damper apparatus 20 comprises a first conductor member 26 which is attachable to one of the movable members 22, 24. In the embodiment shown in FIG. 1, first conductor member 26 further comprises a connecting rod 27 which is attachable to first movable member 22, however, it will be readily apparent that many different connecting structures known in the art may be used to make first conductor member 26 attachable to one of the movable members. First connector member 26 has a magnetically permeable portion 28 which forms a first part (indicated generally by arrows 29a) of a magnetic flux path. Magnetic particle damper apparatus 20 further comprises a second conductor member 30 which is attachable to another one of the first and second movable members 22, 24 and which is spaced apart from the first conductor member 26 to define a gap 32 therebetween. In the embodiment shown in FIG. 1, second conductor member 30 further comprises a connecting rod 31 for attachment to second movable member 24, however, it will be readily appreciated that other connecting structures known in the art could be used to make second conductor member 30 attachable to one of the movable members. The second conductor member 30 has a magnetically permeable portion 34 which forms a second part (indicated generally by arrow 29b) of the magnetic flux path. The magnetically permeable portions 28, 34 of the first and second conductor members are typically formed through the use of materials having a relatively high magnetic permeability with respect to surrounding materials. The magnetically permeable portions 28, 34 of the first and second conductor members 26, 30 include respectively, flux terminal regions 36, 38 where the flux path enters or leaves the conductor members. The position of the flux terminal regions is governed by the geometry of the permeable portions 28, 30 as is known in the art. The flux terminal regions 36, 38 of the first and second conductor members 26 and 30 confront one another across the gap 32. Magnetic particle damper apparatus 20 further comprises a quantity of dry magnetic particles 40a and 40b disposed within the gap 32 between the first and second conductor members 26 and 30. Note, that for purposes of this application, the term "magnetic" refers to materials which are either magnetized or capable of being magnetized. Thus, the magnetic particles 40a and 40b may or may not produce a magnetic field when isolated from external magnetic fields. The portion of the magnetic particles (indicated as 40a) located between the flux terminal regions 36 and 38 of the first and second conductor members forms a third part (indicated generally by arrows 29c) of the magnetic flux path. The remaining portion of the magnetic particles (shown as 40b) away from the flux terminal regions 36, 38 does not generally form a part of the flux path, but rather forms a reservoir of magnetic particles available to replenish the supply of particles between the flux terminal regions. Magnetic particle damper apparatus 20 further comprises a magnetic element 42 fixedly attached to the magnetically permeable portion of one of the first or second conductor members. In the embodiment shown in FIG. 1, magnetic element 42 is attached to the magnetically permeable portion 28 of first conductor member 26, however, other configurations within the scope of the current invention will be readily apparent. Magnetic element 42 produces a magnetic field (not shown), and the magnetic field will predominantly conform to the magnetic flux path shown by arrows 29a, 29b and 29c. In some embodiments, the conductor members 26, 30 may further comprise relatively non-permeable portions positioned to ensure that the magnetic field is predominantly confined to the desired flux path. In the embodiment shown in FIG. 1, a non-permeable portion 43 is positioned adjacent to the magnetic element 42 to prevent the flux path from "short-circuiting" through conductor member 26. The magnetic particles along said flux path (shown as 40a) are influenced by the magnetic field of magnetic element 42 to magnetically adhere to adjacent magnetic particles and to the first and second conductor members 26, 30 thereby causing a force opposing the relative movement of movable members 22, 24 and dissipating energy when the first and second movable members 22, 24 move relative to one another. Without being bound by this explanation, it is believed that the magnetic flux within the gap causes the magnetic particles to form chains or a lattice of interconnected particles which adhere to one another and to the confronting surfaces of the conductor members. Relative movement between the conductor members deforms the magnetic particle lattice. Some chains, or some portions of the lattice, begin to break and reform upon even the smallest relative motion. This produces a force in the direction opposite to the relative motion, and thus dissipates energy when movement occurs. As the relative motion continues, the bonds are being broken and being reformed over more and more of the gap, until they are being broken and are reforming over the entire gap. For motion large enough to have the entire gap region involved in the bond breaking and reforming, a limit force, also known as a slip force, is realized between the moving parts. Once this slip force is reached, the resisting force does not increase further. Instead, further continuous motion produces the same resisting force, i.e., at approximately the slip force magnitude. When the relative motion stops, the chains or lattice realign and the resisting force drops to zero. When relative motion begins, in either the same or opposite direction, the process repeats. The resisting force is essentially provided when there is non-zero rate. Tests have indicated that the magnitude of relative motion required to reach the slip force is very small. The actual magnitude of this motion will be a function of specific design parameters, however, it is typically of the order of 0.01 inch peak to peak. Therefore, damping efficiency is very high for small displacements, and beyond the slip force value it increases more slowly as displacements increases.

In many design situations, high damping for small displacements is desirable. Also, many conventional damping devices provide less damping for small displacements compared to the damping provided at large displacements. A magnetic particle damper according to the current invention can provide the needed high damping for very small displacements, thus replacing or supplementing conventional damping devices in such situations.

Referring still to FIG. 1, magnetic element 42 is a permanent magnet having north and south magnetic poles, 44 and 46, respectively, oriented as shown and producing a magnetic field which predominantly conforms to the magnetic flux path indicated by arrows 29a, 29b and 29c. It will be readily appreciated, however, that an electromagnet, the combination of an electromagnet and a permanent magnet, could be used for the magnetic element of the current invention. The use of an electromagnet will allow the density of the magnetic flux to be varied as is known in the art. Changing the magnetic flux density in the gap region of the damper will produce corresponding changes in the magnetic attraction between the magnetic particles in the gap, thus changing the energy dissipation (i.e., the damping force) of the magnetic particle damper. Thus the current invention can be used in systems requiring "active" or "dynamic" dampers having damping forces which can be rapidly changed to match changes in the system or system input. It will be further appreciated, that depending on the desired shape of the magnetic flux path, the orientation of the poles of a permanent magnet, or the orientation of the windings of an electromagnet, can be changed from that shown in FIG. 1, while remaining within the scope of the current invention.

In all embodiments of the current invention, it is desirable that gap 32 between first and second conductor members 26, 30 be maintained in the presence of the magnetic attraction between the conductor members caused by the presence of magnetic flux therebetween. In some embodiments, gap 32 may be maintained by the relative alignment of movable members 22, 24 and the rigidity of the connections between the movable members and the conductor members 26, 30. In other embodiments, such as shown in FIG. 1, magnetic particle damper 20 may further comprise a frame 48 connected between the first and second conductor members 26, 30 to maintain the gap 32 therebetween.

While a gap must be maintained to provide the unique characteristics of magnetic particle damping, it is likely that in many applications the gap height, i.e., the perpendicular distance between the conductor members, will vary during normal operation of the damper. For example, the gap height in a helicopter lead-lag damper may change as the damper is subjected to out-of-plane oscillatory forces. However, another advantage of the magnetic particle damper is that the height of the gap can vary with no significant change in the damping produced as long as the same magnetic flux density through the gap is maintained. Further, the performance of magnetic particles in magnetic particle clutches indicates that virtually no wear of the conductors will occur as long as some gap is maintained. If, through excessive loading or deflection, the gap of the device is reduced to zero, i.e., no gap, the device will still provide friction damping as the conductor members rub against one another. Though such friction damping has different characteristics from magnetic particle damping and will result in wear on the conductor members, it provides a safe failure mode in cases where some form of damping is always needed, such as in a helicopter lead-lag damper. In contrast, if a conventional fluid damper loses its fluid, it will provide almost no damping.

In the embodiment shown in FIG. 1, first and second conductors 26, 30 further comprise alignment rods 50, 52, respectively, which, along with connecting rods 27, 31 cooperate with passages 54 formed in frame 48 to maintain the alignment of first and second conductor members 26, 30 and to maintain gap 32 therebetween. It will be readily apparent that the use of other structures known in the art for frame 48 is within the scope of the current invention. In the embodiment shown in FIG. 1, the interaction between frame member 48 and connecting rods 27, 31 and alignment rods 50, 52 limits the relative movement between the first and second conductor members 26, 30 to substantially translational motion, i.e., the conductor members do not rotate with respect to one another.

Referring now to FIG. 2A, an end view of magnetic particle damper 20 is shown taken along lines 2A—2A of FIG. 1. In FIG. 2A, it is shown that conductor members 26, 30 are limited to relative motion in the direction of arrow 25 (best seen in FIG. 1) by the interaction of connecting rod 27 and alignment rod 52 in the like-shaped passages 54 of frame 48 such that gap 32 is maintained between the conductor members. FIG. 2B shows an alternative embodiment of the current invention in which the passages 54 in frame 48 are adapted to allow connecting rod 27 and alignment rod 52 to move in the direction shown by arrow 56 relative to one another as well as in the direction shown by arrow 25 (best seen in FIG. 1), to allow two-dimensional translational motion while maintaining gap 32 between the conductor members 26, 30.

Referring again to FIG. 1, under many operational conditions, it will be desirable to protect the magnetic particle damper 20, and especially the magnetic particles 40 themselves, from the outside environment. In such cases, magnetic particle damper 20 may further comprise a housing 58 having a wall 60 defining an interior cavity 62 containing the gap 32 and magnetic particles 40. The wall 60 is adapted to allow attachment of the conductor members 26, 30 to the movable members 22, 24 and to allow relative motion between the conductor members. In the embodiment shown in FIG. 1, the wall 60 of housing 58 encloses the frame 48, conductor members 26, 30, the gap 32 and the magnetic particles 40, thereby protecting all of these elements from the external environment. Also note that in the embodiment shown, frame 48 is separate from housing 58, however, embodiments in which the frame and housing are combined in a single structure are within the scope of the current invention.

It is preferred that the magnetic particle damper 20 be sealed from the outside environment for several reasons. Firstly, it is desirable to control the influx of environmental moisture into the damper. Moisture can be corrosive to some magnetic materials which can be used for magnetic particles 40 or conductor members 26 and 30. However, even when magnetic materials are utilized which do not corrode due to moisture, it is still desirable to control moisture since moisture can freeze in the magnetic particles and prevent their free motion, thus impairing damper effectiveness. Secondly, the magnetic particles may become contaminated with oils, solvents or other substances that enter the apparatus and attack or corrode the elements within or otherwise impede normal operations. Thirdly, sealing the damper prevents the loss of magnetic particles 40 from within the damper apparatus. In some embodiments, a sliding seal can be used on wall 60 of housing 58 to allow relative movement of the conductor members 26, 30 or their respective connecting members such as connecting rods 27, 31. In order to keep the magnetic particles from leaking and contaminating the surrounding components, in a preferred embodiment, such as shown in FIG. 1, housing 58 further comprises elastomeric seals 64 bonded between the wall 60 and each of the conductor members 26, 30 passing through the wall 60 from the interior cavity 62. In the embodiment shown in FIG. 1, elastomeric seals 64 are bonded to the connecting rods 27, 31 of conductor members 26, 30 at grooves 66 formed in the connecting rods so as to prevent slippage of the elastomeric seals relative to the connecting rods. In this embodiment, the flexibility of the wall 60 and elastomeric seal 64 of housing 58 allow relative movement between conductor members 26 and 30 while the interior cavity 62 remains isolated from the external environment.

Under many operational conditions, it is preferable to monitor the integrity of the housing to insure that moisture or other contaminants have not entered the damper apparatus and affected the magnetic particles therein. For example, moisture entering the interior cavity of the damper shown in FIG. 1 could cause corrosion of the magnetic particles, or, under circumstances of low temperature operation, the moisture could freeze into ice, thereby preventing relative movement between the conductor members 26, 30 and severely degrading the damping action of the damper apparatus. In order to monitor the integrity of the housing, magnetic particle damper 20 may further comprise a pressurized gas (not shown) contained within the interior cavity 62 of housing 58 and a pressure transducer 70 disposed within the interior cavity 62 of housing 58. The pressurized gas could comprise any of a number of gases known in the art which are noncorrosive and noncondensable under normal operating conditions expected for the damper. Such gases would normally include dry air and nitrogen, among others. When the pressurized gas and pressure transducer 70 are utilized, a failure of the elastomeric seal 64 or other portion of housing 58 is detectable by a reduction in the pressure of the pressurized gas as measured by the pressure transducer 70 and detectable at transducer terminal 72.

Since moisture is one of the most likely contaminants which can enter housing 58 and degrade damping performance, damper apparatus 20 may further comprise a moisture detector 74 disposed within the interior cavity 62 of housing 58. The moisture detector 74 may be used as an alternative to, or in combination with a pressure transducer 70 as previously described. When moisture detector 74 is used, the interior cavity 62 of housing 58 must be filled with a dry gas, however, the gas need not be pressurized to a pressure above the ambient pressure of the outside environment. When moisture detector 74 is used, a failure of the elastomeric seal 64 or other failure of the integrity of housing 58 which allows moisture to enter the interior cavity 62 will be detectable by the presence of moisture as measured by moisture detector 74 and reported at moisture detector terminal 76.

Figure 3B:
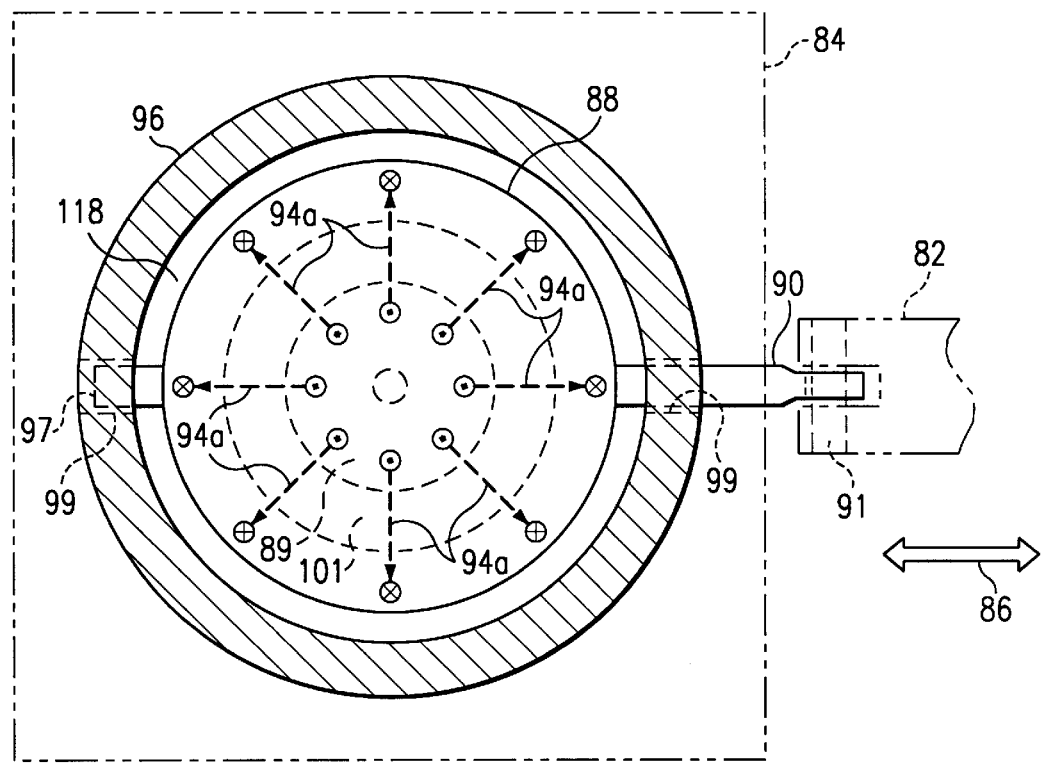
FIG. 3B is a sectional view of the damping apparatus of FIG. 3A taken along line 3B—3B of FIG. 3A.

As previously discussed, a magnetic particle damping apparatus according to the current invention may have a variety of configurations. Referring now to FIGS. 3A, and 3B, an alternative embodiment of a magnetic particle damper apparatus 80 is shown for damping motion between a first and second relatively movable members 82 and 84, respectively (shown in phantom), which move in the direction indicated generally by arrow 86. As in previous embodiments, damper apparatus 80 comprises first and second conductor members 88 and 96, respectively, a magnetic element 89, and a quantity of dry magnetic particles 108. First conductor member 88 is attachable to one of the movable members. In the embodiment shown in FIG. 3A, first conductor member 88 includes a connecting rod 90 which is attachable to first movable member 82 by means of a pin 91. First conductor member 88 has magnetically permeable portion 92 which form a first part (indicated generally by arrows 94*a*) of a magnetic flux path and non-permeable portions 101 which serve to substantially direct the magnetic flux along the desired path. The second conductor member 96 is attachable to the second movable member 84 and is spaced apart from the first conductor member 88 to define a gap 98 therebetween. In this embodiment, second conductor member 96 completely surrounds first conductor member 88, thereby functioning as both a frame and a housing, as well as being a conductor member. An alignment member 97 formed on first conductor member 88 cooperates with connecting rod 90 and passages 99 formed in second conductor member 96 to limit movement between the conductor members to substantially longitudinal motion and to maintain gap 98. Referring again to FIG. 3A, it will be seen that second conductor member 96 is connected directly to second movable member 84. This connection may be made by any number of means known in the art including bolts or screws (if a removable connection is desired) or adhesives or welding (if a permanent connection is desired). The second conductor member 96 has magnetically permeable portions 100 which form a second part (indicated generally by arrows 94*b*) of the magnetic flux path and magnetically non-permeable portions 102 which serve to substantially direct the magnetic flux path along the desired path. The magnetically permeable portions 92, 100 of the first and second conductor members 88, 96 include respectively, flux terminal regions 104, 106 where the flux path enters or leaves the conductor members. The position of the flux terminal regions is governed by the geometry of the permeable portions 92, 100 and the non-permeable portions 101, 102 of the conductor members as is known in the art. The flux terminal regions 104, 106 of the first and second conductor members confront one another across the gap 98. A quantity of dry magnetic particles 108 is disposed within the gap 98 between the conductive portions of the conductor members. A portion of the magnetic particles (indicated as 108*a*) located between the flux terminal regions 104, 106 of the first and second conductor members forms a third part (indicated generally by arrows 94*c*) of the magnetic flux path.

In this alternative embodiment shown in FIGS. 3A and 3B, magnetic element 89 is attached to the first conductor member 88 with its magnetic axis (i.e., a line connecting the opposite magnetic poles) oriented perpendicular to the spanwise dimension of gap 98. Magnetic element 89 confronts a second flux terminal region (shown as 110) of second conductor member 96 across the gap 98. The portion (shown as 108*b*) of the magnetic particles between the magnetic element 89 and the second flux terminal region 110 forms a fourth part (indicated generally by arrows 94*d*) of the magnetic flux path. As seen in FIGS. 3A and 3B, in this embodiment, the magnetic flux path 94 has a generally toroidal shape, that is, the flux passes axially upward through the magnetic element 89 (shown by the symbol ⊙ in FIG. 3B), then passes radially outward through the upper portion of first conductor member 88, then axially downward (shown by the symbol ⊕ in FIG. 3B) through the outer portion of the first conductor member 88 and portion 108*a* of the magnetic particles, then radially inward through the permeable portion 100 of the second conductor member 96, then axially upward through portion 108*b* of the magnetic particles and back to the opposite side of magnetic element 89. Note that the "direction" of flux flow is dependent upon the orientation of the magnetic element 89 and that the damper 80 would function equally well if the flux flowed in the opposite direction. This toroidal flux path configuration for magnetic damper 80 provides a highly efficient package because a significant fraction of the magnetic particles 108 in the gap 98 are included in the flux path and thus contribute to the damping effect.

While it is possible for magnetic element 89 to contact the magnetic particles 108 directly, in the alternative embodiment shown in FIGS. 3A and 3B, a third conductor member 112 is provided which is fixedly attached to the magnetic element 89 and confronts the second flux terminal region 110 of second conductor member 96. Third conductor member 112 can be attached to magnetic element 89 directly, or as best seen in FIG. 3A, third conductor member 112 can be attached to first conductor member 88 by a magnetically non-permeable bolt 114, or other means known in the art, thereby trapping magnetic element 89 between the two conductor members 88, 112. This arrangement is advantageous because it protects magnetic element 89 from wear or erosion from direct contact with magnetic particles 108. It also maintains the operational integrity of magnetic element 89 even if the element cracks or breaks apart during operation, because even if magnetic element 89 breaks apart, for many magnetic materials, the magnetic effects will be little changed if the position of the pieces relative to one another and to the conductor members is maintained. Third conductor member 112 has magnetically permeable portions 116 which form a fifth part (shown generally by arrows 94*e*) of the magnetic flux path. It will be readily apparent, that the use of a third conductor member having other configurations is also within the scope of the current invention. In the embodiment shown in FIGS. 3A and 3B, a sealing member 118 is provided between first and second conductor members 88, 96 to confine the magnetic particles 108 within gap 98. Sealing member 118 may be formed of rubber or another elastomeric material known in the art which will prevent the loss of magnetic particles while allowing relative movement between the conductor members.

Figure 4:
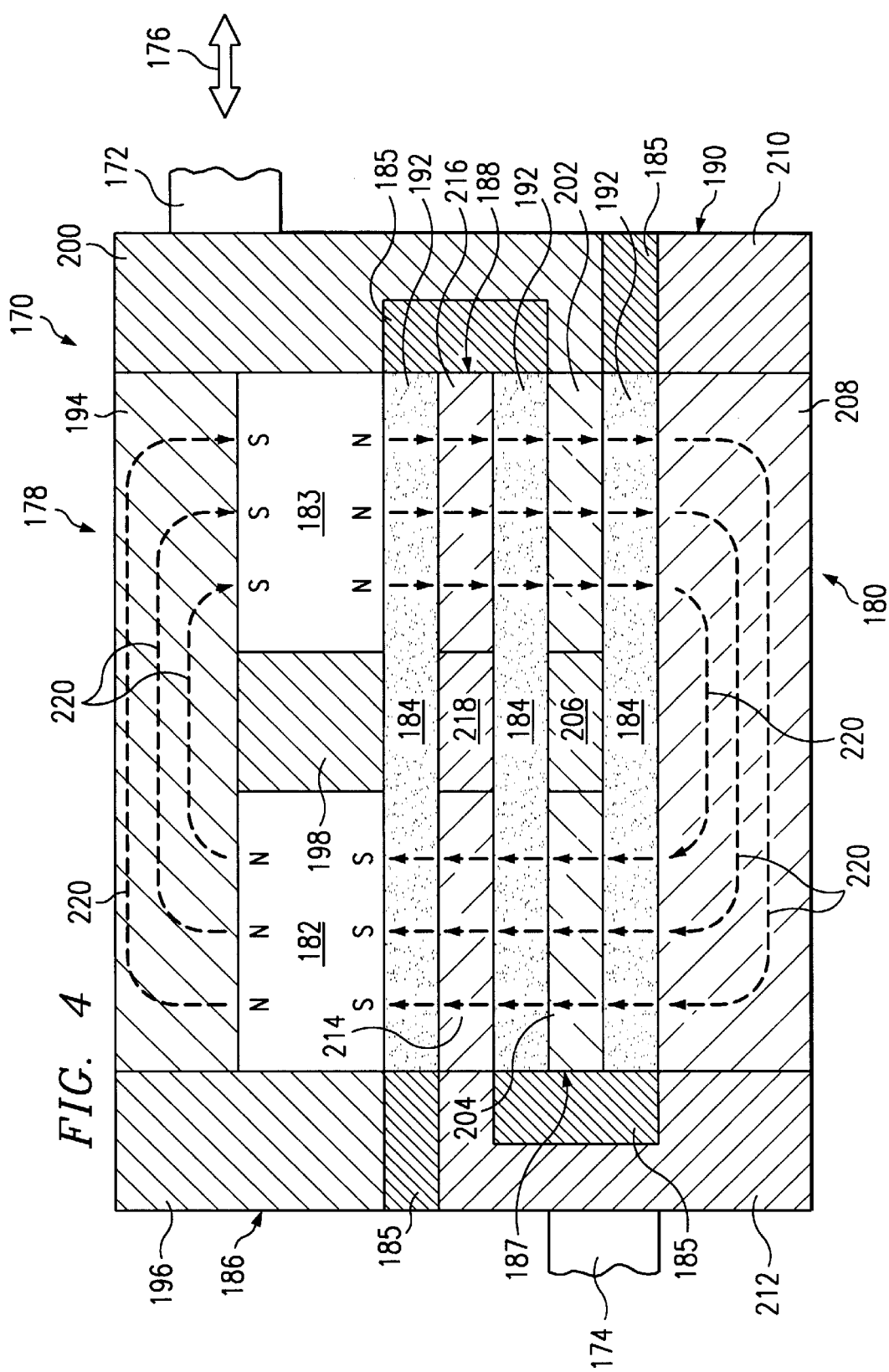
FIG. 4 is side view in partial section of yet another embodiment of a magnetic particle damping apparatus having multiple gaps.

In yet another alternative embodiment of the current invention, the conductor members can be configured to define a plurality of magnetic particle-filled gaps arranged in series along a single magnetic flux path. Referring now to FIG. 4, an alternative magnetic particle damper apparatus 170 is shown for damping vibratory motion between the first and second relatively movable members 172 and 174, respectively, which move in the direction indicated generally by arrow 176. As in previous embodiments, damper apparatus 170 comprises first and second conductor members 178 and 180 respectively, a magnetic element 182 and a quantity of magnetic particles 184. In the embodiment shown, a second magnetic element 183 is provided to produce a symmetrical design, however, the use of multiple magnetic elements is not required.

First conductor member 178 is attachable to one of the movable members and second conductor member 180 is attachable to another of the movable members. In the embodiment shown in FIG. 4, first conductor member 178 is connected to first movable member 172 and second conductor member 180 is connected to second movable member 174. At least one of the conductor members has a plurality (i.e., at least two) of plate portions disposed spaced-apart from, and generally parallel to, one another to define a slot therebetween. The other conductor member has at least one plate portion which is interposed between the plurality of plate portions of the first conductor member to define a plurality of gaps between the respective plate portions of the two conductor members. These gaps are filled with dry magnetic particles. For example, in the embodiment shown in FIG. 4, first conductor member 178 has two plate portions, 186 and 187, and second conductor member 180 also has two plate portions, 188 and 190. The plate portions are interleaved with one another to form three gaps 192 and each of the gaps 192 is filled with a quantity of dry magnetic particles 184. Elastomeric spacers 185 are provided to maintain the spacing between the conductor members in this embodiment, although other means to maintain spacing of the conductor members could be used as previously discussed. Each of the conductor members includes magnetically permeable portions and magnetically non-permeable portions forming a magnetic flux path which substantially directs the magnetic flux of the magnetic element along a desired path through each of the gaps filled with magnetic particles. In the embodiment shown in FIG. 4, the first conductor member 178 has permeable portions 194 and non-permeable portions 196, 198 and 200 on upper plate portion 186 and permeable portions 202 and 204 and non-permeable portion 206 on lower plate member 187. The second conductor member 180 has permeable portion 208 and non-permeable portions 210 and 212 on lower plate portion 190 and permeable portions 214 and 216 and non-permeable portion 218 on upper plate portion 188. The permeable and non-permeable portions of the conductor members define a flux path, shown generally by arrows 220, directing the magnetic flux from magnetic elements 182 and 183 in a magnetic circuit which extends from the poles of magnetic elements 182 and 183 and passes through the permeable portions of the conductor member and the magnetic particles 184 located within the gaps 192 between the conductor members. The behavior of the magnetic particles 184 within the gaps 192 along the magnetic flux path 220 is identical to that described in previous embodiments, i.e., the magnetic particles adhere to one another and to the confronting surfaces of the conductor members producing a force opposing relative motion between the conductor members and thereby dissipating energy when the conductor members move relative to one another. By stacking the gaps in series, however, the active area of magnetic particles comprising the damping apparatus can be increased without significantly increasing the area or extent of the damper housing. Such configurations can be used to provide greater damping effect in a more compact package for applications where space is at a premium. It will be readily apparent that the number of gaps utilized in an interleaved configuration such as shown in FIG. 4 can be increased as necessary without departing from the scope of this invention.

Figure 5A:
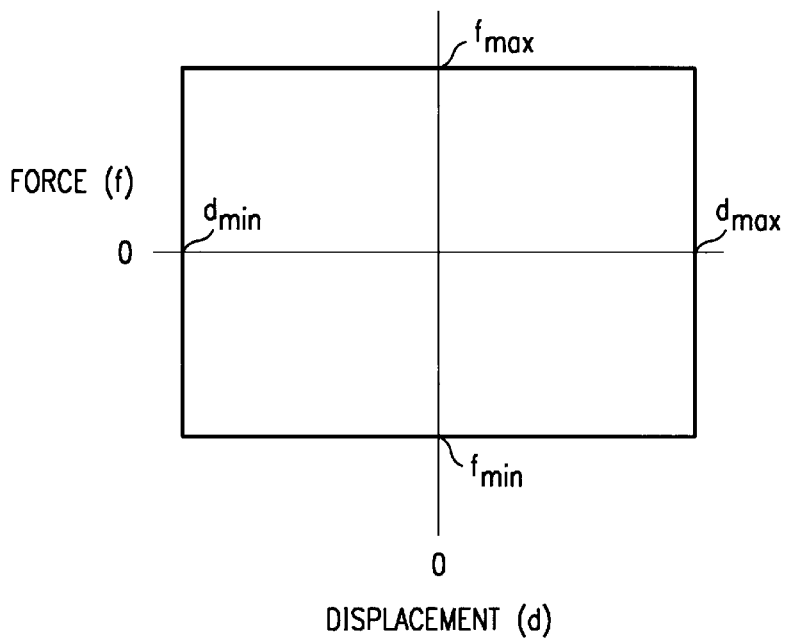
FIG. 5A is a graph showing the force versus displacement characteristics of a theoretical "perfect" friction damper driven with constant amplitude sinusoidal oscillatory motion at a fixed frequency.
Figure 5B:
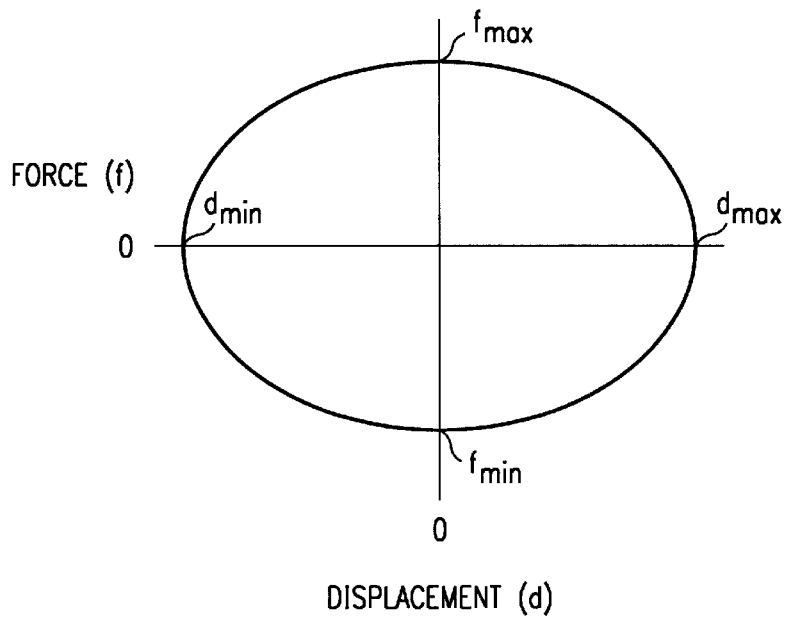
FIG. 5B is a force versus displacement graph, similar to FIG. 5A, for a theoretical "pure" viscous damper.

Referring now to FIGS. 5A through 5E, force versus displacement graphs, also known as force-displacement cross-plots, are shown for various dampers to illustrate the operation and advantages of the current invention. Note, that like any damper, the magnetic particle damper apparatus of the current invention dissipates energy only when the movable members to which it is connected are moving relative to one another. Thus, the force versus displacement graphs shown in FIGS. 5A through 5E are for movable members oscillating relative to one another at a frequency ω. In these cross-plots, the displacement, d, represents the displacement of the damper's movable members relative to one another, while the force, f, represents the force produced by the damper which opposes the relative movement of the movable members. The energy dissipated by a damper per cycle is equal to the area enclosed by the force-displacement cross-plot. Thus the comparative energy dissipation of different dampers can be assessed by comparing the area enclosed by each damper's respective cross-plot. In addition, damper efficiency can be objectively quantified by comparing the measured damping energy dissipated per cycle to the damping energy dissipated per cycle by a so-called perfect friction damper. A perfect friction damper would have a force-displacement cross-plot described by a rectangle as shown in FIG. 5A. The damping energy dissipated per cycle for such a perfect friction damper would be the area of the rectangle, i.e., $(f_{max}-f_{min})*(d_{max}-d_{min})$, where $d_{max}$ and $d_{min}$ are, respectively, the peak displacements in each direction of the movable members relative to one another and $f_{max}$ and $f_{min}$ are, respectively, the peak forces in each direction produced by the damper to oppose the relative motion of the movable members. For purposes of this application, the damping efficiency of a damper hereforth is defined as the ratio of energy dissipated per cycle by the subject damper to the energy dissipated per cycle by a perfect friction damper having the same peak displacements and forces, and is expressed in percent. A 100% damping efficiency means that the subject damper is as efficient as the perfect friction damper. For comparison, a pure viscous damper would have a force-displacement cross-plot described by an ellipse as shown in FIG. 5b. The damping energy dissipated per cycle for such a pure viscous damper will be the area of the ellipse, i.e., $(\pi/4)*(f_{max}-f_{min})*(d_{max}-d_{min})$. Therefore, the efficiency of a pure viscous damper is 78.5%, that is, in each cycle it will dissipate 78.5% of the energy dissipated by a pure friction damper.

Figure 5C:
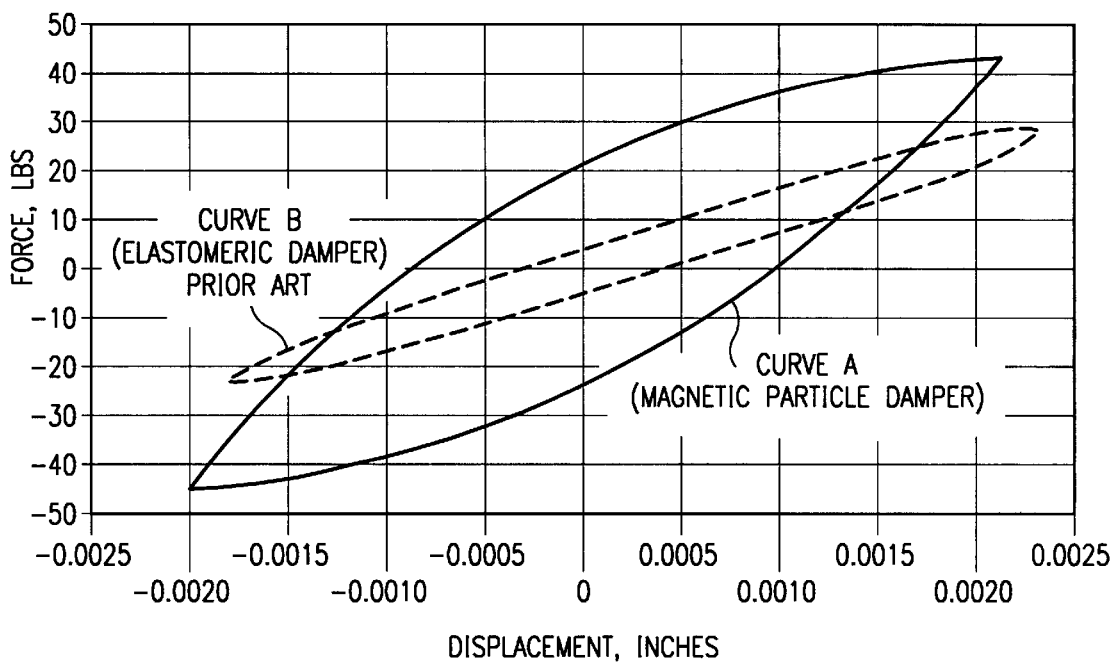
FIG. 5C is a graph showing the actual force versus displacement characteristics for a magnetic particle damper according to one embodiment of the current invention and for an elastomeric damper according to the prior art, both being driven with constant amplitude sinusoidal oscillatory motion at a fixed frequency where the amplitude of motion corresponds to a force on the magnetic particle damper which is below the slip force.
Figure 5D:
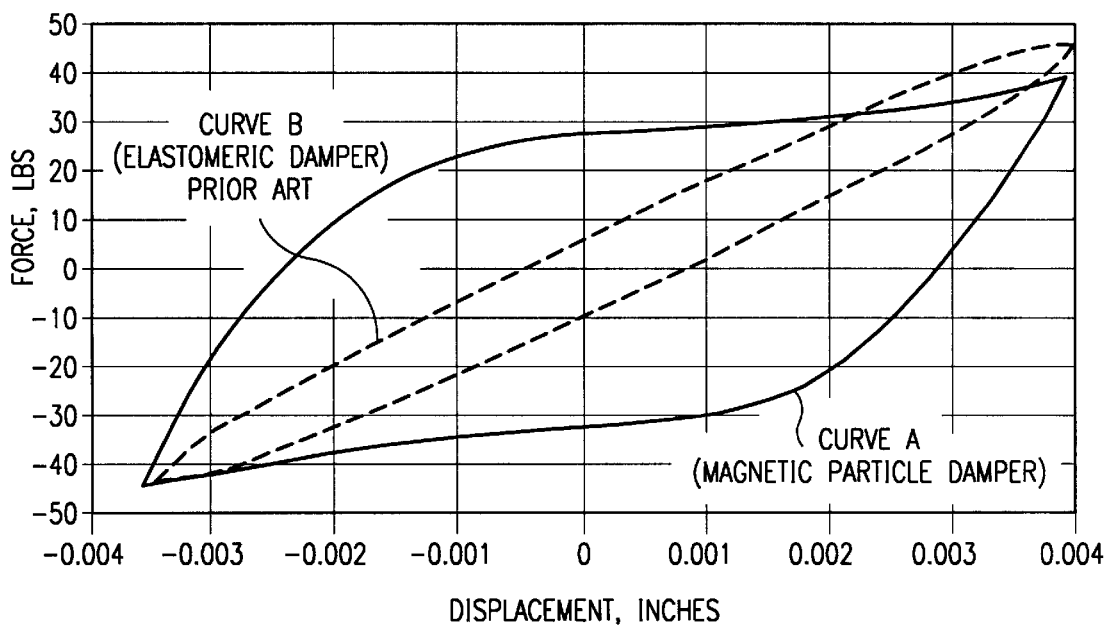
FIG. 5D shows another pair of actual force versus displacement graphs similar to FIG. 5C, where the amplitude of motion corresponds to a force on the magnetic particle damper which approaches the slip force.
Figure 5E:
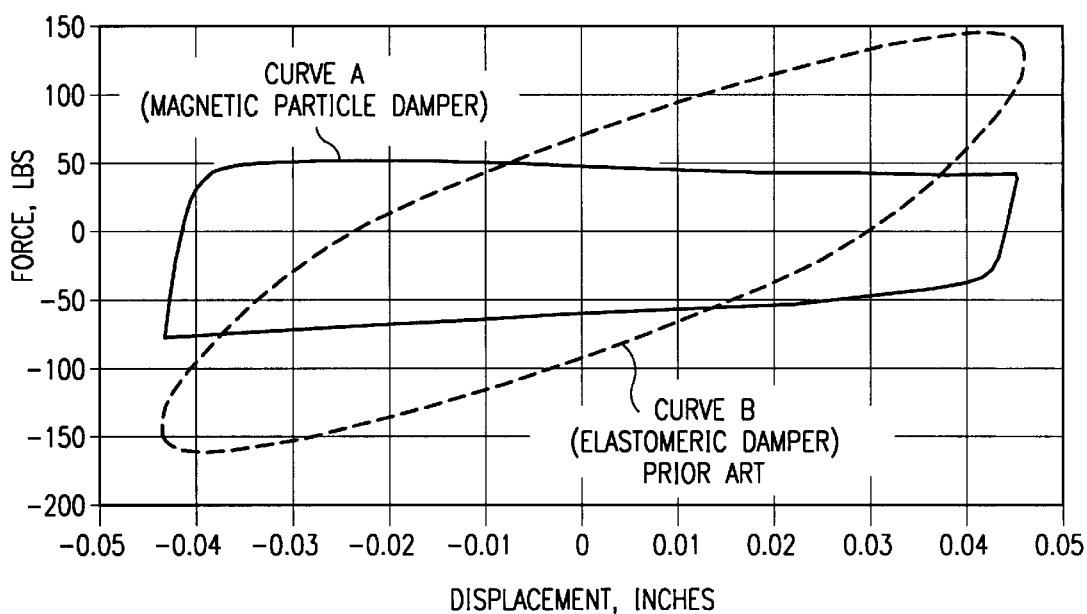
FIG. 5E shows yet another pair of actual force versus displacement graphs, similar to FIG. 5C, where the amplitude of motion exceeds the motion corresponding to the magnetic particle damper slip force.

Referring now to FIGS. 5C–5E, force-displacement cross-plots are shown for a magnetic particle damper according to one embodiment of the current invention (shown as Curve A) and an elastomeric damper according to the prior art (shown as Curve B). In each case, the movable members attached to the magnetic particle damper and elastomeric damper were oscillated at the same frequency (in this case, ω=4.0 HZ) over approximately the same peak to peak displacements, d (approximately 0.004 to 0.10 inches, peak to peak). In each case, the opposing forces, f, produced by the respective dampers in response to the movement was also measured to produce the cross-plot graphs.

Figure 7A:
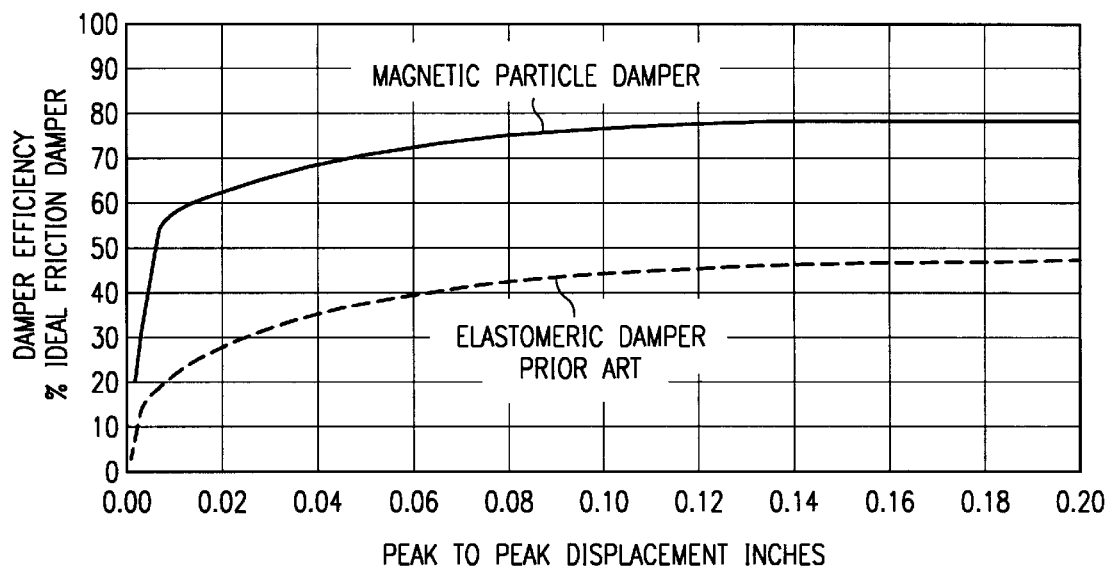
FIG. 7A is a graph showing damper efficiency versus peak to peak oscillatory displacement for a magnetic particle damper according to one embodiment of the current invention and for an elastomeric damper according to the prior art.
Figure 7B:
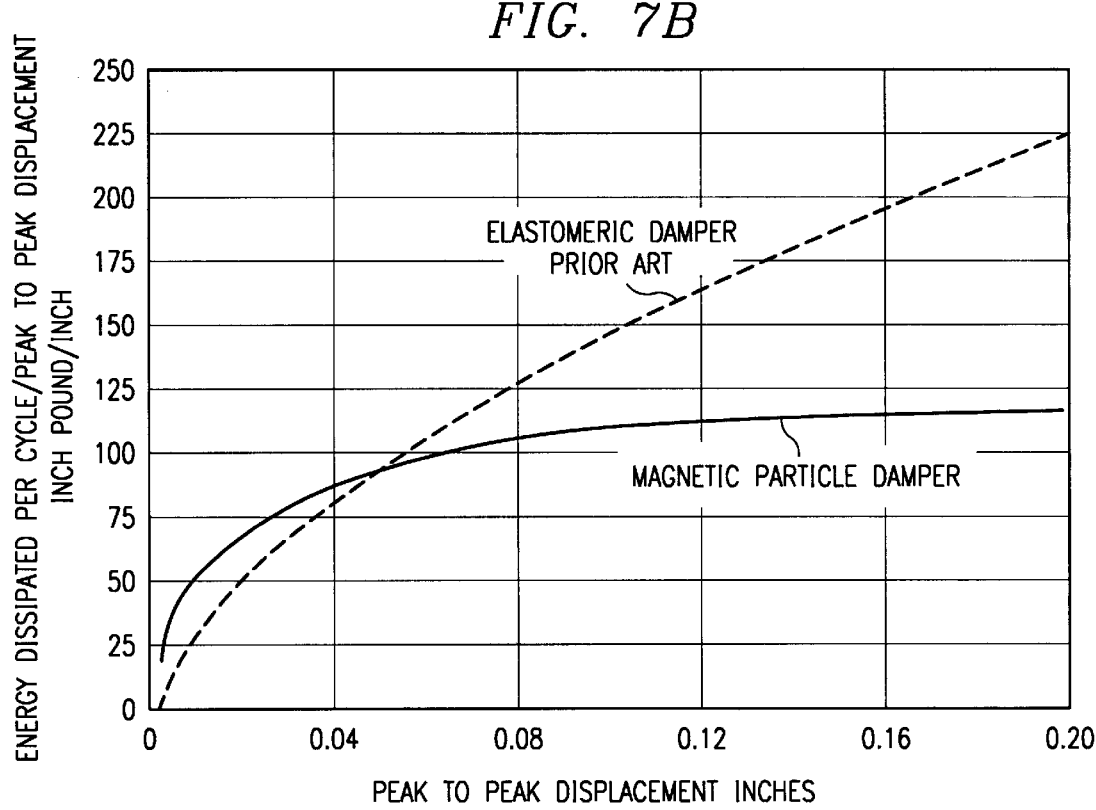
FIG. 7B is a graph showing energy dissipated per oscillatory cycle divided by peak to peak oscillatory displacement versus peak to peak oscillatory displacement for a magnetic particle damper according to one embodiment of the current invention and for an elastomeric damper according to the prior art.

Referring now to FIGS. 7A and 7B, graphs of the damping efficiency versus peak to peak displacement and energy dissipated per cycle/peak to peak displacement versus peak to peak displacements are shown for a magnetic particle damper according to the current invention and for an elastomeric damper according to the prior art. As seen in FIG. 7A, the damper efficiency of the magnetic particle damper is higher than the elastomeric damper throughout the test range. The comparative improvement in damping at low displacement is very large. As seen if in FIG. 7B, the magnetic particle damper has energy dissipation per cycle/peak to peak displacement that is higher than the elastomeric damper at low peak to peak displacements but which at moderate peak to peak displacements is lower than the elastomeric damper. Therefore, the magnetic particle damper will have better damping at low displacements but will generate less heat and lower loads for large amplitude displacements.

The actual performance of a magnetic particle damper according to one aspect of the current invention and an elastomeric damper according to the prior art are shown for three different peak to peak displacements in FIGS. 5C, 5D and 5E. The calculated damper efficiencies for these conditions are shown in Table 1. Referring first to FIG. 5C, a cross-plot graph is shown for small peak to peak displacements which correspond to peak forces on the magnetic particle damper which are below the slip limit.

TABLE 1

Comparison of Magnetic Particle and Elastomeric Damper

| Peak to Peak Displacement (Approximate) Inches | Damping Efficiency Percent of Idea Friction Damper | | Energy Dissipation per Cycle/Peak to Peak Displacement Inch Pound/Inch | |
| --- | --- | --- | --- | --- |
| | Magnetic Particle Damper | Elastomeric Damper | Magnetic Particle Damper | Elastomeric Damper |
| .004 | 33 | 15 | 31 | 8 |
| .008 | 55 | 19 | 43 | 20 |
| .090 | 76 | 43 | 104 | 132 |

At such small amplitude oscillation, the magnetic particle damper produces greater opposing forces and dissipates energy more efficiently than the elastomeric damper of the prior art.

Referring next to FIG. 5D, a cross-plot graph is shown for the two dampers of FIG. 5C for peak to peak displacements which correspond to peak forces on the magnetic particle dampers which are near the slip force limit. For oscillations of this amplitude, the magnetic particle damper produces approximately the same opposing forces as the elastomeric damper, but dissipates considerably more energy per cycle at greater efficiency.

Referring finally to FIG. 5E, a cross-plot graph is shown for the two dampers of FIG. 5C for peak to peak displacements which exceed the displacement corresponding to the slip force and cause the magnetic particles to slip. The slippage of the magnetic particles keeps the peak forces on the magnetic particle damper at approximately the slip force level, whereas the peak forces on the elastomeric damper are much higher. Thus, for such relatively large peak to peak displacements, the magnetic particle damper produces significantly lower peak forces than the elastomeric damper due to the built-in force limit caused by the magnetic particle slippage. This lower peak force allows the magnetic particle damper or the associated structural members to have a reduced maximum strength requirement compared to the prior art, which can allow lighter weight designs. The lower energy dissipation rate per cycle also serves to reduce heat build-up in the damper at high oscillations. This unique and unexpected result of high damping efficiency at low displacements coupled with the self-limiting damper force and high efficiency at higher displacements allows the magnetic particle damper apparatus of the current invention to effectively damp out low amplitude vibrations while avoiding the build-up of excessive loads and/or excessive heat when the same damper is used in high amplitude applications.

Dry magnetic particles suitable for use in the current invention are dry particles of any magnetically permeable material including particles comprising pure iron, silicon iron (various silicon contents), iron oxide, stainless steel (such as powder made from hard-drawn 303, 304, or 316 stainless wire), strontium ferrite, and magnetic alloys, as is known in the art. In one embodiment, the dry magnetic particles comprise a magnetic stainless steel alloy of the 304 stainless steel type. In another embodiment, the dry magnetic particles comprise strontium ferrite which is both magnetic and shows no tendency to rust. The dry magnetic particles suitable for use in the current invention have a diameter within the range of about 1 to 100 micron, with a preferred diameter being within the range of about 2 to 8 micron. In some embodiments, the dry magnetic particles may be co-mixed with a dry lubricant such as graphite powder, dry silicon powder, and stearic acid. The purpose of the dry lubricant is to reduce the friction-type interaction forces, thus ensuring that the breakout force is minimized.

Figure 6A:
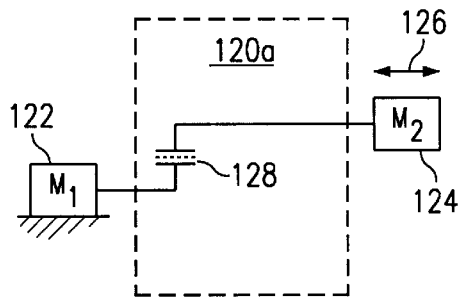
FIG. 6A is a schematic diagram of a damper-only embodiment of the current invention.
Figure 6B:
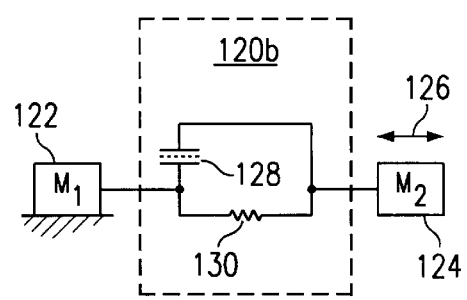
FIG. 6B is a schematic diagram, similar to FIG. 6A, of another embodiment of the current invention comprising a magnetic particle damper connected in parallel with a spring element.
Figure 6C:
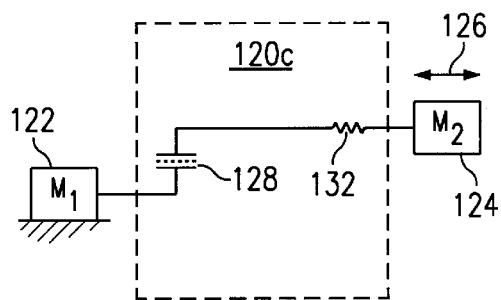
FIG. 6C is a schematic diagram, similar to FIG. 6A, of a further embodiment of the current invention comprising a magnetic particle damper connected in series with a spring element.
Figure 6D:
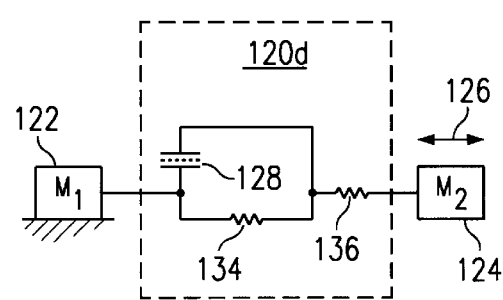
FIG. 6D is a schematic diagram, similar to FIG. 6A of yet another embodiment of the current invention comprising a magnetic particle damper connected in series and in parallel with multiple spring elements.

The damper apparatus previously described can be represented, in its simplest embodiment, as shown in FIG. 6A, wherein the magnetic particle damper apparatus 120 is shown connected between a first movable member 122 and a second movable member 124. For purposes of description, first movable member 122 is assumed to be fixed while second movable member 124 is assumed to oscillate in the direction indicated by arrow 126. In the embodiment shown schematically in FIG. 6A, damper apparatus 120a consists only of a magnetic particle damper 128 as previously described. Referring now generally to FIGS. 6B through 6D, where it is desired to change the damping characteristics of a damping apparatus according to the current invention, the magnetic particle damper may be combined with linear and nonlinear springs, masses and dampers (magnetic particle or other types) as required to develop and design desired dynamic systems, as is known in the art. Such uses of the magnetic particle damper is within the scope of this invention. Referring first to FIG. 6B, a first alternative magnetic particle apparatus 120b comprises a magnetic particle damper 128 connected in parallel with a spring element 130. Referring now to FIG. 6C, a second alternative magnetic particle damper apparatus 120c comprises a magnetic particle damper 128 connected in series with a spring 132. Referring now to FIG. 6D, a third alternative magnetic particle damper apparatus 120d comprises a magnetic particle damper 128 connected in parallel with a first spring 134, and both the damper 128 and first spring 134 connected in series with a second spring 136.

Figure 8A:
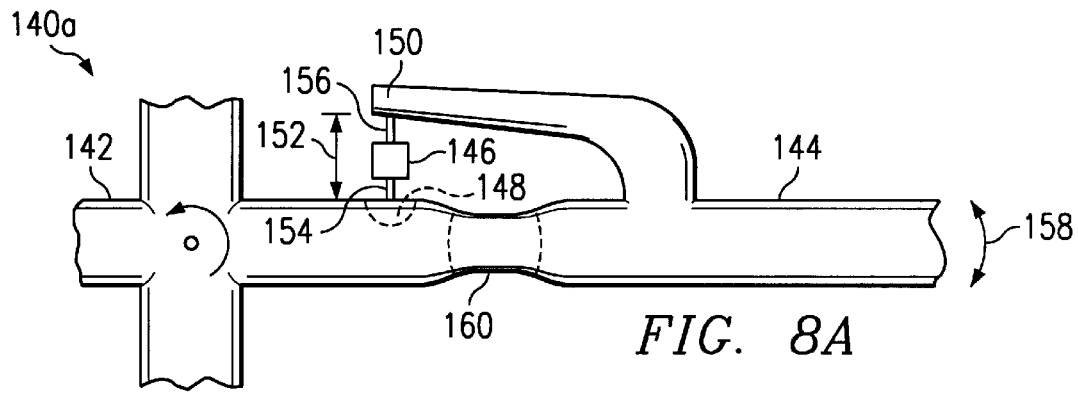
FIG. 8A is a plan view of a first embodiment of helicopter rotor assembly according to another aspect of the current invention.
Figure 8B:
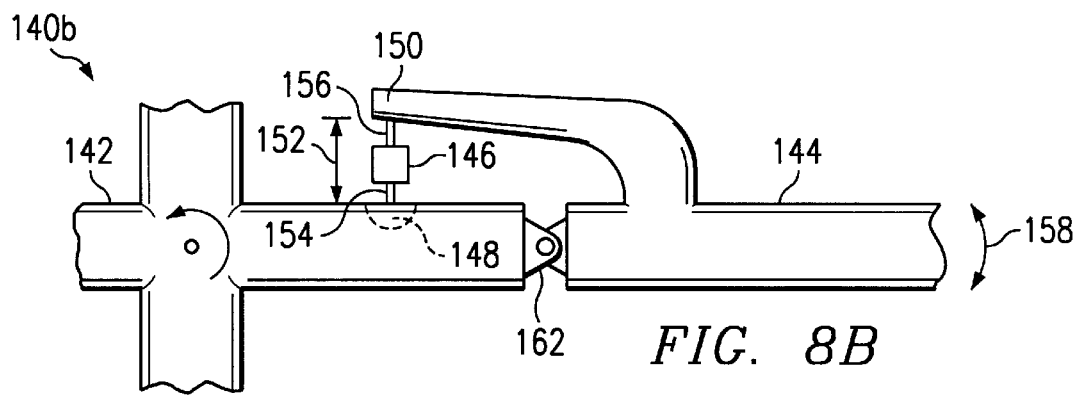
FIG. 8B is a plan view of an alternative embodiment of helicopter rotor assembly.

Referring now to FIGS. 8A and 8B, two embodiments of another aspect of the current invention are shown. In each embodiment, a helicopter rotor assembly 140 (shown as either 140a or 140b) is provided comprising a rotating yoke member 142, a blade member 144 and a magnetic particle damper 146. Yoke member 142 has a first damper attachment portion 148 and blade member 144 has a second damper attachment portion 150 located a distance, shown by arrow 152, from the damper attachment portion of the yoke member. Blade member 144 is movable with respect to yoke member 142 so as to cause the distance 152 between the first and second damper attachment portions to change. Magnetic particle damper 146 has a first conductor member 154 connected to one of the damper attachment portions, in this case first damper attachment portion 148, and a second conductor member 156 attached to the other damper attachment portion, in this case second damper attachment portion 150. Damper 146 comprises a magnetic particle damper apparatus as previously described. Oscillations of blade member 144 in the lead-lag direction, shown by arrow 158, will cause distance 152 to change, such that magnetic particle damper 146 will dissipate energy and thereby dampen the oscillations. The helicopter rotor assembly of this aspect of the current invention may be of the bearingless type shown in FIG. 8A in which the blade 144 is connected to the yoke 142 by means of a flexure portion 160 as is known in the art. Alternatively, the helicopter rotor assembly 140 may be of the conventional type, shown as 140b in FIG. 8B in which blade member 144 is connected to yoke member 142 by a lead-lag pivot bearing 162 as is known in the art.

Figure 9:
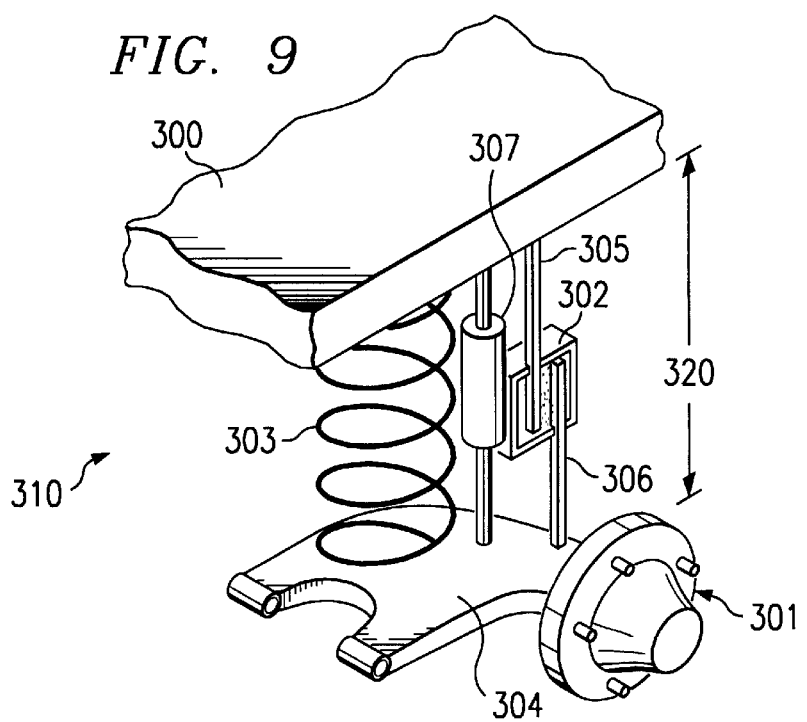
FIG. 9 is a schematic diagram of an automotive suspension system according to yet another aspect of the current invention.

Referring now to FIG. 9, an embodiment of another aspect of the current invention is shown. In this embodiment an automobile suspension system 310 is shown comprising a wheel hub 301, mounted on a suspension arm 304, automobile body 300, a suspension spring 303, a shock absorber 307 and a magnetic particle damper 302. The magnetic particle damper 302 has a first conductor member 305 connected to the automobile body 300 and second conductor member 306 connected to the suspension arm 304. The suspension arm 304 and wheel hub 301 translate relative to the body 300 in response to road inputs. The magnetic particle damper 302 comprises a magnetic particle damper apparatus as previously described. The relative motion between automobile body 300 and suspension arm 304 will cause distance 320 between the automobile body and suspension arm 304 to change, such that magnetic particle damper will dissipate energy and thereby provide damping. Such a magnetic particle damper provides shock absorber and damper function in an automobile suspension system. The magnetic particle damper 302 can utilize permanent magnets, electromagnets or a combination of both to provide fixed or a variable damping. Such variable damping can be controlled as a function of driving conditions, or driver selection to provide desired controllability or ride as is known in the art. The magnetic particle damper can be used in place of or in addition to the conventional shock absorber 307 or other dampers or shock absorbers.

Various changes, alternatives and modifications will become apparent to those of ordinary skill in the art following a reading of the foregoing description. It is intended that all such changes, alternatives and modifications that come within the scope of the appended claims be considered part of the present invention.

What is claimed is:

1. A helicopter rotor assembly comprising:
   a rotating yoke member;
   a blade member connected to the yoke member, the blade member being movable relative to the yoke member; and
   a magnetic particle damper apparatus having a first conductor member connected to the yoke member and a second conductor member connected to the blade member, the first and second conductor members having confronting surfaces defining a gap therebetween that is filled with magnetic particles, the magnetic particle damper having a magnetic element producing a magnetic flux density in the magnetic particles in the gap, thereby influencing the magnetic particles to adhere to one another and to the first and second conductor members to produce a force opposing relative motion between the yoke member and the blade, thereby dissipating energy and providing damping.

2. The helicopter rotor assembly as recited in claim 1 wherein the magnetic element is a permanent magnet.

3. The helicopter rotor assembly as recited in claim 1 wherein the magnetic element is an electromagnet.

4. The helicopter rotor assembly as recited in claim 3 wherein the magnetic flux density produced by the electromagnet is selectively variable, thereby changing the magnetic particle damper damping characteristics.

5. The helicopter rotor assembly as recited in claim 1 wherein the magnetic element comprises a permanent magnet and an electromagnet.

6. The helicopter rotor assembly as recited in claim 1 wherein the magnetic particle damper further comprises a frame being connected between the first and second conductor member and maintaining the gap therebetween.

7. The helicopter rotor assembly as recited in claim 6 wherein the frame limits the relative movement between the first and second conductor members to substantially translational motion.

8. The helicopter rotor assembly as recited in claim 1 wherein a damping efficiency of at least 35% is provided for relative movement between the first and second conductor members when the movement is oscillatory motion having a peak-to-peak amplitude of up to about 0.002 inches.

9. The helicopter rotor assembly as recited in claim 1 wherein a damping efficiency of at least 50% is provided for relative movement between the first and second conductor members when the movement is oscillatory motion having a peak-to-peak amplitude of up to about 0.01 inches.

10. The helicopter rotor assembly as recited in claim 1 wherein a damping efficiency of at least 70% is provided for relative movement between the first and second conductor members when the movement is oscillatory motion having a peak-to-peak amplitude of up to about 0.1 inches.

11. The helicopter rotor assembly as recited in claim 1 further comprising a housing having a wall defining an interior cavity, the gap and the magnetic particles being contained in the interior cavity.

12. The helicopter rotor assembly as recited in claim 10 wherein the housing further comprises an elastomeric seal bonded between the wall and each of the first and second conductor members passing through the wall from the interior cavity, the elastomeric seal allowing limited movement of the first and second conductor member relative to the housing and sealing the interior cavity from the external environment, whereby the gap and magnetic particles are isolated from the external environment.

13. The helicopter rotor assembly as recited in claim 12 further comprising a pressurized gas contained within the interior cavity of the housing, a pressure transducer disposed within the interior cavity of the housing, whereby a failure of the elastomeric seal is detectable by a reduction in the pressure of the pressurized gas measured by the pressure transducer.

14. The helicopter rotor assembly as recited in claim 12 further comprising a moisture detector disposed within the interior cavity of the housing, whereby a failure of the elastomeric seal is detectable by the presence of moisture measured by the moisture detector.

15. The helicopter rotor assembly as recited in claim 1 wherein the magnetic particles comprise a material selected from the group consisting of pure iron, silicon iron, iron oxide, magnetic stainless steel, and strontium ferrite.

16. The helicopter rotor assembly as recited in claim 1 wherein the magnetic particles comprise a magnetic stainless steel alloy of the 304 stainless steel type.

17. The helicopter rotor assembly as recited in claim 1 further comprising a dry lubricant commixed with the magnetic particles.

18. The helicopter rotor assembly as recited in claim 17 wherein the dry lubricant comprises a material selected from the group consisting of graphite powder, dry silicon powder and stearic acid.

19. A helicopter rotor assembly comprising;
   a rotating yoke member;
   a blade member connected to the yoke member, the blade member being movable relative to the yoke member; and a magnetic particle damper apparatus comprising:
- a first conductor member connected to the yoke member, the first conductor member having a magnetically permeable portion being a first part of a magnetic flux path;
- a second conductor member connected to the blade member and being spaced-apart from the first conductor member to define a gap therebetween, the second conductor member having a magnetically permeable portion being a second part of the magnetic flux path;
- a quantity of dry magnetic particles disposed within the gap between the first and second conductor members, the magnetic particles being a third part of the magnetic flux path; and
- a magnetic element fixedly attached to the magnetically permeable portion of one of the first and second conductor members, the magnetic element producing a magnetic field that predominantly conforming to the magnetic flux path such that the magnetic particles along the flux path are influenced by the magnetic field to magnetically adhere to adjacent magnetic particles and to the first and second conductor members thereby producing forces which oppose relative motion between the yoke member and the blade member and dissipating energy when the yoke member and the blade member move relative to one another.

* * * * *